United States Patent

Ponomarev-Stepnoy et al.

[11] Patent Number: 5,962,597
[45] Date of Patent: Oct. 5, 1999

[54] SOLID POLYMER SORBENT FOR MO-99 EXTRACTION AND ITS METHOD OF PRODUCTION

[75] Inventors: Nikolai N. Ponomarev-Stepnoy; Vladimir A. Pavshook; Grigoriy F. Bebikh; Vladimir Ye. Khvostionov; Peter S. Trukhlyaev; Ivan K. Shvetsov; Yelena L. Vandysh, all of Moscow, Russian Federation

[73] Assignee: TCI Incorporated, Albuquerque, N.Mex.

[21] Appl. No.: 09/019,782

[22] Filed: Feb. 6, 1998

[51] Int. Cl.[6] ........................................ C08F 8/30
[52] U.S. Cl. .................... 525/329.6; 525/327.6; 525/377
[58] Field of Search .............. 525/329.6, 327.6, 525/377

[56] References Cited

U.S. PATENT DOCUMENTS

| | | | |
|---|---|---|---|
| 3,040,006 | 6/1962 | Slocombe et al. | 525/377 |
| 3,488,329 | 1/1970 | Johnson | 525/327.6 |
| 5,093,429 | 3/1992 | Moteki et al. | 525/327.6 |

*Primary Examiner*—Bernard Lipman
*Attorney, Agent, or Firm*—Robert W. Becker & Associates

[57] ABSTRACT

A polymer sorbent for the extraction of Mo-99 from the fission byproducts of a uranyl sulfate nuclear-fueled homogeneous-solution nuclear reactor and the method of producing the sorbent are described. This sorbent is produced from a maleic anhydride copolymer and α-benzoin-oxime. The sorbent is produced by reacting a mixture of maleic anhydride copolymer, a bifunctional organic compound (hydrochinon, diethyleneglycol, hexamethylene diamine, glycerol, ethyleneglycol), and α-benzoin-oxime in the ratio of 1:(0.25–0.50):(0.75–0.5) in a polar organic solvent (dioxane, dimethyl formamide, or toluene) in the temperature range of 90°–95° C. with constant stirring for 1 to 2 hours. The resultant product is then cooled to room temperature and flushed 3–5 times with cold water. A white stringy product results. This is dried and crushed. Particles of 1–2 mm in diameter are selected for the solid sorbent.

2 Claims, 3 Drawing Sheets

FOR THE BOX-2 SORBENT, $C_{105}H_{97}O_{24}N_3$ (M=1783)

|  | CALCULATED | FOUND |
|---|---|---|
| %C | 70.66 | 69.16 |
| %H | 5.44 | 5.48 |
| %N | 2.35 | 2.17 |

X = $OC_6H_4O-$; $-OC_2H_4O-$; $-NH(CH_2)_6NH-$; $-OCH_2CH(OH)CH_2O-$

SOLID POLYMER SORBENT FOR MO-99 EXTRACTION AND ITS METHOD OF PRODUCTION

BACKGROUND OF THE INVENTION

1. Field of the Invention

The present invention relates to solid polymer sorbents, and in particular to a solid polymer sorbent and the method of producing it used for fission molybdenum-99 (Mo-99) extraction from an irradiated uranyl sulfate solution.

2. Description of the Prior Art

At the present time more than 50% of the world's annual production of radionuclides are used for medical purposes, such as for the early diagnoses of diseases and for therapy. A basic condition of the use of radionuclides in medicine is the requirement that the radiation exposure of a patient be minimal. This necessitates the use of short-lived radionuclides. A nuclide with a short half-life, however, creates difficulties in transportation and storage. The preferred radionuclide for medical purposes is Mo-99 with a half-life of 66 hours. Mo-99 decay results in Tc-99m with a half-life of 6 hours, and about 140 keV of gamma ($\gamma$) energy convenient for detection. Currently, more than 70% of diagnostic examinations are performed using this radionuclide.

Various means are used to produce the medical isotope Mo-99. These generally involve nuclear reactors with the final process being the chemical extraction of Mo-99. For example, U.S. Pat. No. 3,799,883 discloses dissolving uranium material in aqueous inorganic acid and then precipitating Mo-99 using alpha-benzoinoxime.

U.S. Pat. No. 5,596,611 discloses a small, dedicated uranyl nitrate homogeneous reactor for the production of Mo-99. A portion of the uranyl nitrate solution from the reactor is directly siphoned off and passed through columns of alumina to fix some of the fission products, including Mo-99, to the alumina. The fixed fission products from the alumina column are then removed through elution with a hydroxide and the Mo-99 is precipitated out of the resultant elutriant with alpha-benzoinoxime ($\alpha$-BO).

A particular feature of $\alpha$-BO is that Ag, Pb, Hg, Bi, Cu, Cd, As, Sb, Sn, Al, Fe, Ti, Zr, Cr(III), V(IV), Ce, U, Ni, Co, Mg, and Zn are not precipitated by it from sulfuric acid and Se, Te, Ru, Ro, Os, Ir, and Pt are not precipitated when they are alone in the solution.

The difficulty with $\alpha$-BO Mo-99 complex extraction is the low absorption rate and the low radiation resistance on exposure to neutrons, $\alpha$-, $\beta$-, and $\gamma$-rays of this sorbent.

SUMMARY OF THE INVENTION

The polymer sorbent of the present invention is produced of a maleic anhydride copolymer and $\alpha$-benzoin-oxime. It is used to extract Mo-99 from the fission byproducts of a uranyl sulfate nuclear-fueled homogeneous-solution nuclear reactor. The structural formula of the BOX-2 sorbent is:

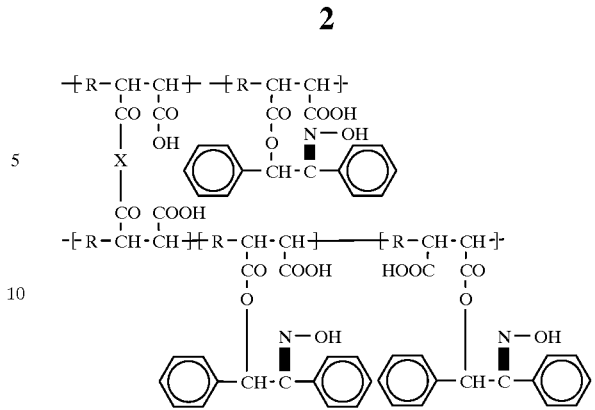

For the BOX-2 Sorbent, $C_{105}H_{97}O_{24}N_3$ (M=1783)

|     | Calculated | Found |
|-----|------------|-------|
| % C | 70.66      | 69.16 |
| % H | 5.44       | 5.48  |
| % N | 2.35       | 2.17  |

Where X=—$OC_6H_4O$—; —$OC_2H_4O$—; —$HN(CH_2)_6NH$—; or —$OCH_2CH(OH)CH_2O$— and R=styrene, acrylic acid ether or vinyl acetate

DESCRIPTION OF THE PREFERRED EMBODIMENT

The present invention is a polymer sorbent for fission Mo-99 extraction from an irradiated uranyl sulfate solution ($UO_2SO_4 \cdot 3H_2O$). The Mo-99 is produced by fissioning of the uranium in a homogeneous solution nuclear reactor. This reactor and the method of obtaining the Mo-99 material are the subject of a concurrent application.

Figure 1:
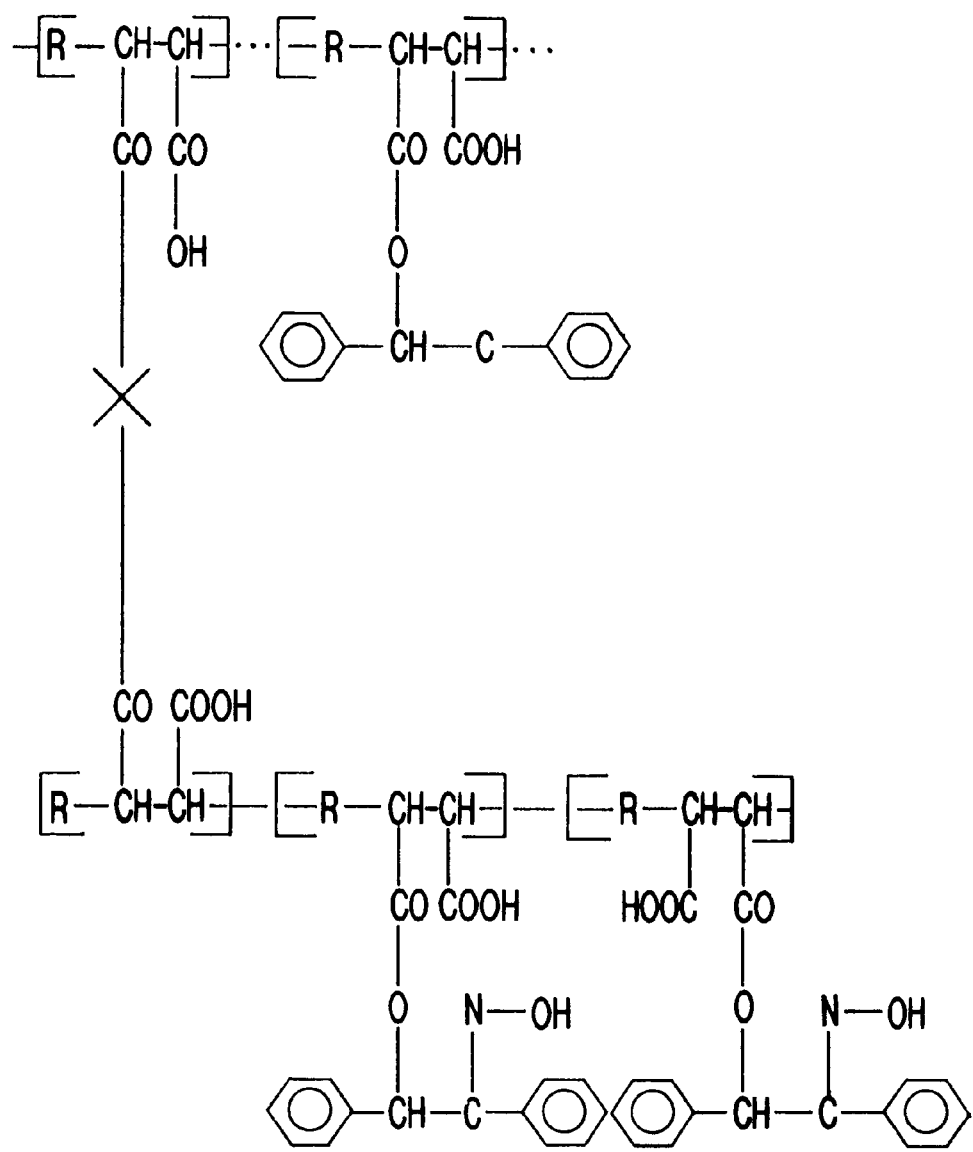
FIG. 1 is the general formula of the composite sorbent.

Mo-99 is generated, along with other fission products, in this reactor. The preferred quantitative extraction of Mo-99 from the uranyl sulfate solution is by the use of a maleic anhydride copolymer and $\alpha$-BO used as a solid sorbent. This solid high-molecular sorbent has the form of grains with sizes ranging from 0.1 mm up to 5 mm or larger. The general formula of the sorbent of the present invention (called the BOX-2 sorbent) is shown in FIG. 1.

The BOX-2 sorbent is produced as follows. The reaction is conducted in a solution of a polar organic solvent (dioxane, dimethyl formamide or toluene) in the temperature range of 90°–95° C. with constant stirring for 1 to 2 hours with the interaction of the maleic anhydride copolymer, bifunctional organic compound (hydrochinon, diethyleneglycol, hexamethylene diamine, glycerol, ethyleneglycol), and $\alpha$-benzoin-oxime in the motar ratio of 1:(0.25–0.50):(0.75–0.5).

The reaction proceeds according to the following scheme:

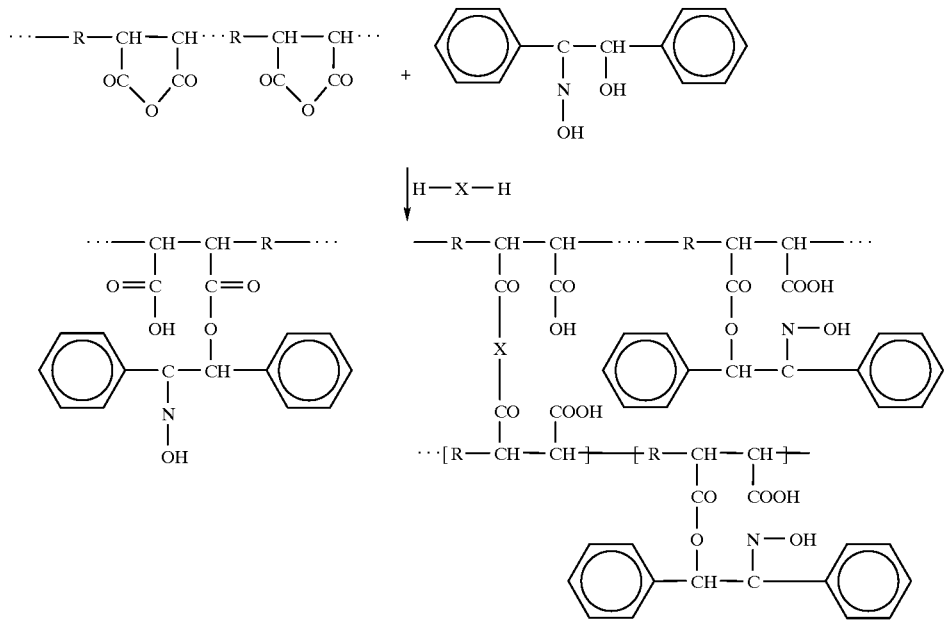

Figure 2:
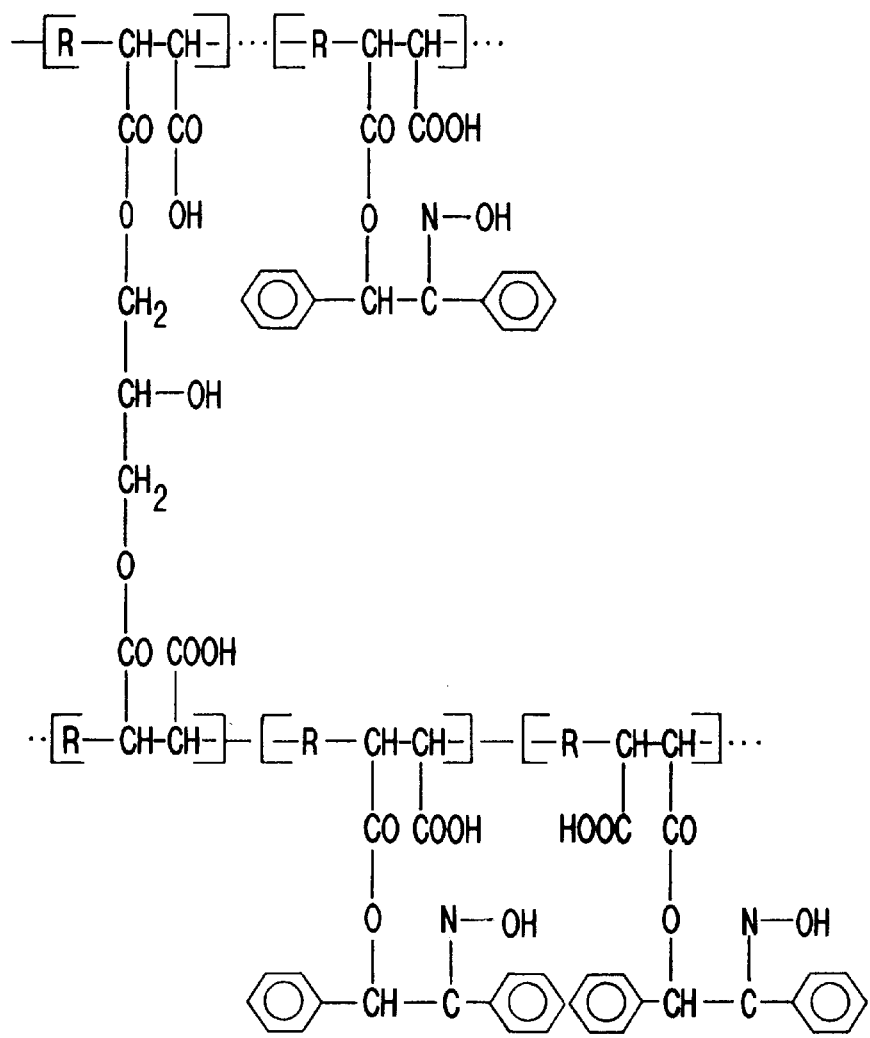
FIG. 2 is the structural formula of one inventive sorbent.

On the completion of the reaction, the product is cooled down to room temperature (20° C. to 25° C.) and washed 3–5 times with an excess of cold water. This results in the generation of a white stringy product that is dried and crushed. A fraction with 1–2 mm diameter particles is selected. The sorbent softening temperature is 125–150° C. The product is not soluble in water acid media, nor in organic solvents. The structural formula of one specific BOX-2 sorbent obtained is shown in FIG. 2.

The sorbent IR spectrum contains the absorption bands characteristic of functional groups OH, CH, C=O, COOR, C=N and substituted benzene rings in the regions 3500–3300, 2960–2880, 1715, 1650, and 650 cm$^{-1}$, respectively, that confirm the structure of the obtained compound.

The absorption of elements by the sorbent from the uranyl sulfate solution was determined by the distribution coefficient ($K_d$). $K_d$ for Mo-99, Tc-99m, and U-235 was determined under steady-state conditions. The elements were absorbed with continuous mechanical stirring by the vibration stirrer VS-1 (3000 oscillations/minute) at room temperature for 15 minutes. Ninety-three to ninety-eight percent of the Mo-99 was absorbed.

The quantity of radioisotopes in the water phase was determined by the application of the solution aliquot part over the stainless steel target with the subsequent radiometric measurements in α-, β-, and γ-facilities. The results showed that $K_d$ for the elements absorbed by the sorbent BOX-2 were as follows: $K_d^{Mo}$=1048, $K_d^{Tc}$=628, and $K_d^{U}$–0 (Table 1), that is, Mo-99 yield was 99.7% and U-235 was not absorbed.

TABLE 1

Distribution Coefficients (Kd) for Mo-90, Tc-99m, U-235 between the Uranyl Sulfate Solution (pH = 1) and BOX-2 Sorbent

| | Radionuclide composition of specimens | | | Kd | | |
|---|---|---|---|---|---|---|
| | Mo-99 | Tc-99m | U-235 | Mo-99 | Tc-99m | U-235 |
| Initial | 8470 | 8940 | 800 | — | — | — |
| Final | 80 | 140 | 880 | 1048 | 628 | 0 |

Figure 3:
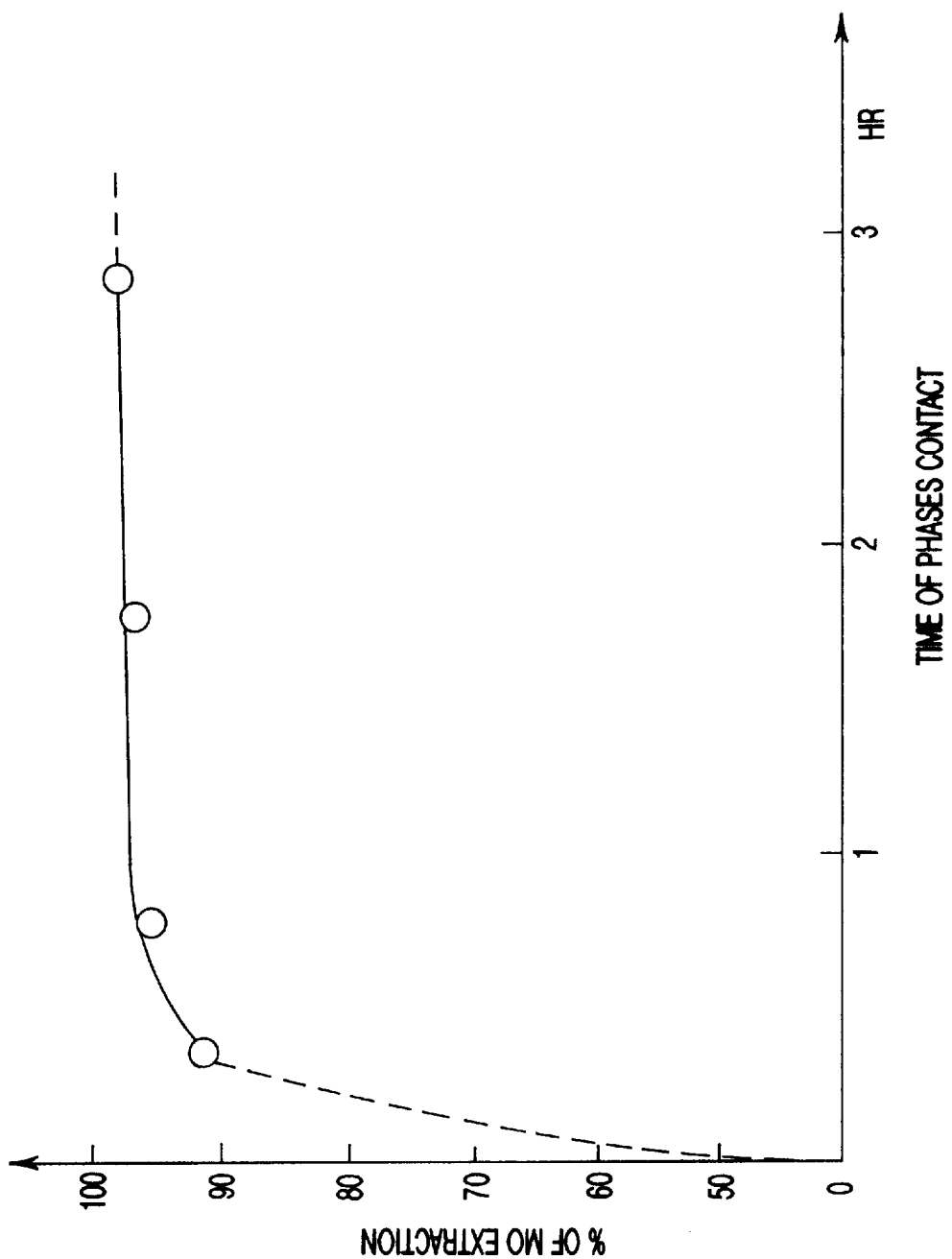
FIG. 3 shows the absorption of Mo-99 by the BOX-2 sorbent vs. the time of phases' contact.

Mo-99 extraction by the BOX-2 sorbent under dynamic conditions was performed in the extraction-chromatographic column. Mo absorption was performed under atmospheric pressure (by the force of gravity). Mo-99 yield was 99.7%, while 60.4% of Tc-99m was absorbed and U-235 was not absorbed (at least 99.99% remained in the solution). Reference is made to FIG. 3 that shows the absorption of Mo-99 by the BOX-2 sorbent vs. the time of phases' contact. The results of Mo-99 and Tc-99m tests of the extraction capabilities of the BOX-2 sorbent from the model uranyl sulfate solution (pH=1) under column conditions are listed in Table 2.

TABLE 2

Mo-99, Tc-99m Extraction from the Model Uranyl Sulfate Solution by the BOX-2 Sorbent under Dynamic (Column) Conditions

| No. of Collectors | Solution Volume ml | Radionuclide composition of samples | | | Mo absorption in collectors % |
|---|---|---|---|---|---|
| | | Mo-99 | Tc-99m | U-235 | |
| Initial | 12 | 588,000 | 564,000 | 23,500 | >99 |
| 1 | 2 | 35 | 2,600 | 90 | >99 |
| 2 | 2 | 470 | 2,700 | 2,350 | >99 |
| 3 | 2 | 385 | 46,500 | 6,800 | >99 |
| 4 | 2 | 325 | 55,000 | 6,500 | >99 |
| 5 | 2 | 225 | 49,000 | 5,000 | >99 |

TABLE 2-continued

Mo-99, Tc-99m Extraction from the Model Uranyl Sulfate Solution by the BOX-2 Sorbent under Dynamic (Column) Conditions

| No. of Collectors | Solution Volume ml | Radionuclide composition of samples | | | Mo absorption U-235 in collectors % |
|---|---|---|---|---|---|
| | | Mo-99 | Tc-99m | | |
| 6 | 2 | 180 | 43,000 | 2,650 | >99 |
| 7 | 2 | 70 | 18,500 | 100 | >99 |
| 8 | 2 | 50 | 6,350 | 20 | >99 |
| Total | 16 | 1730 | 223,650 | 23,520 | Avg. 99.70 |

To determine the BOX-2 sorbent radiation stability, it was irradiated by three different γ-radiation doses. Radiation was performed in the TUT-200 Co source of 500 R/s power. It was established that the maximum dose for the BOX-2 exposure must not be much greater than 9 Mrad.

The BOX-2 sorbent has a selectivity of Mo-99 that is greater than 90%, has almost no uranium absorption, and has improved thermal stability and radiation resistance.

The present invention is, of course, in no way restricted to the specific disclosure of the specifications and drawings, but also encompasses any modifications within the scope of the appended claims.

We claim:

1. A composition of matter suitable for extracting Mo-99 from the fission byproducts of a uranyl sulfate nuclear-fueled homogeneous-solution nuclear reactor, comprising a compound of the formula:

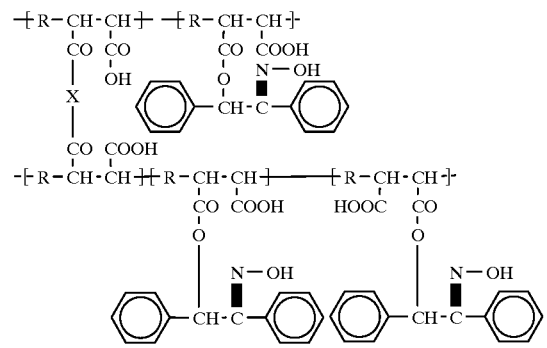

Wherein $X = OC_6H_4O-$; $-OC_2H_4O-$; $-HN(CH_2)_6NH-$; or $-OCH_2CH(OH)CH_2O-$ and R=styrene, acrylic acid ether or vinyl acetate.

2. A method of preparing a composite sorbent of a maleic anhydride copolymer and α-benzoin-oxime used to extract Mo-99 from the fission byproducts of a uranyl sulfate nuclear-fueled homogeneous-solution nuclear reactor, comprising the steps of:

(a) reacting a mixture of maleic anhydride copolymer, a bifunctional organic compound selected from the group consisting of hydrochinon, diethyleneglycol, hexamethylene diamine, glycerol, and ethyleneglycol, and α-benzoin-oxime in the weight ratio of 1:(0.25–0.50):(0.75–0.5) in a polar organic solvent selected from the group consisting of dioxane, dimethyl formamide and toluene in the temperature range of 90° C.–95° C. with constant stirring for 1 to 2 hours;

(b) thereafter cooling said resultant product down to 20–25° C. and flushing with cold water 3–5 times;

(c) drying and crushing the resultant white stringy product; and (d) selecting 1–2 mm diameter particles.

* * * * *